H. D. COLMAN.
WARP UNITING MACHINE.
APPLICATION FILED APR. 20, 1908.
1,069,081.
Patented July 29, 1913.
14 SHEETS—SHEET 1.
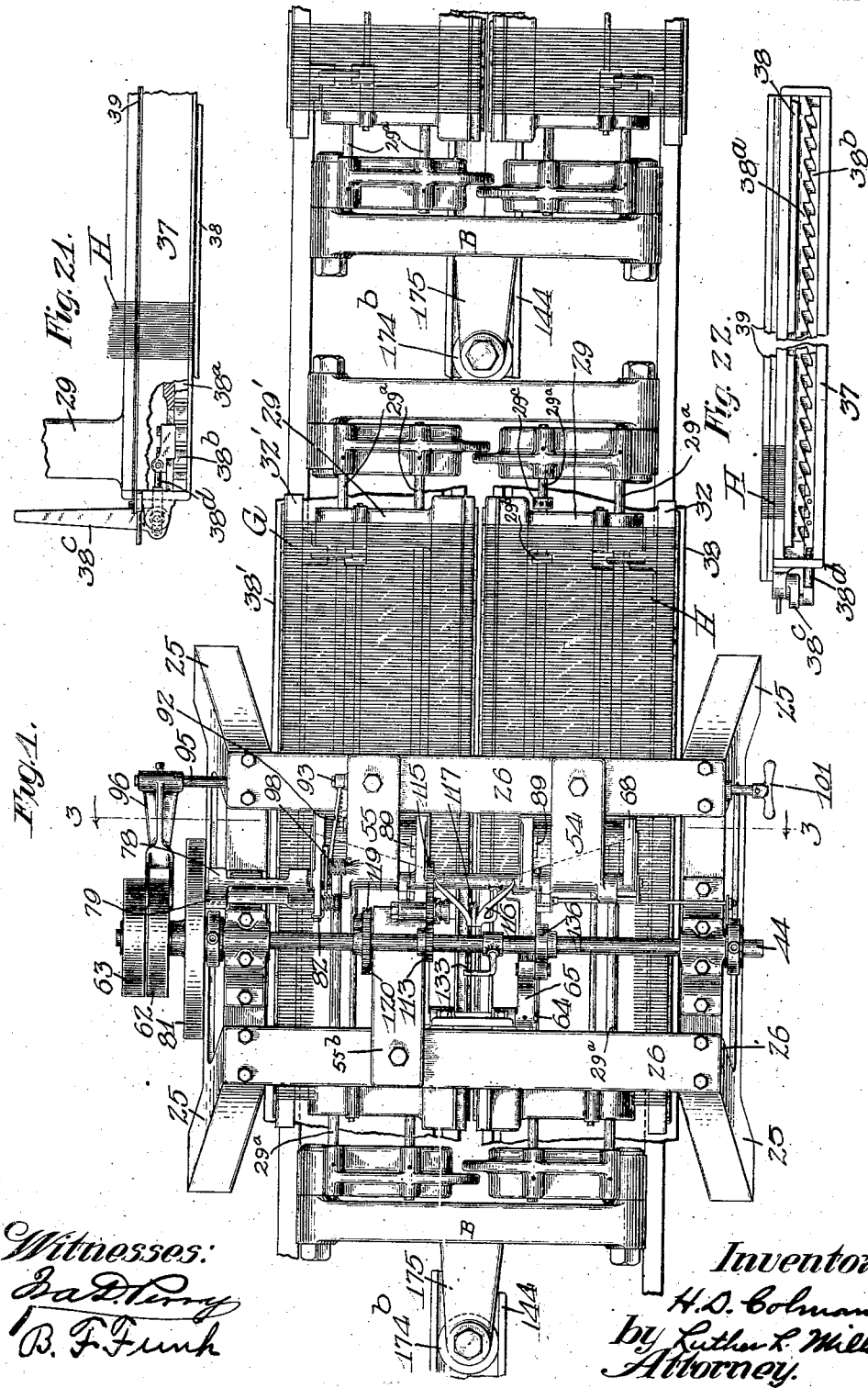

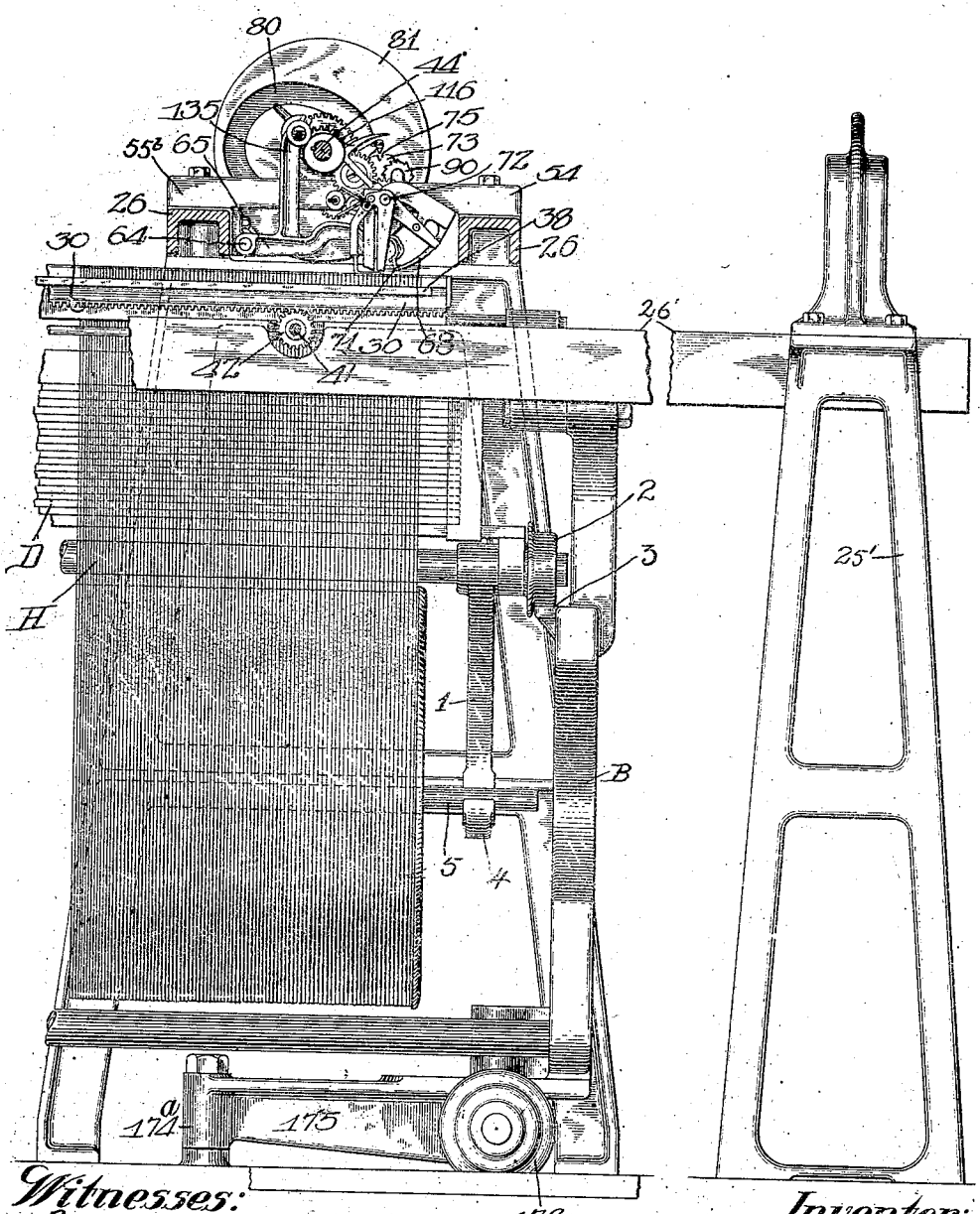

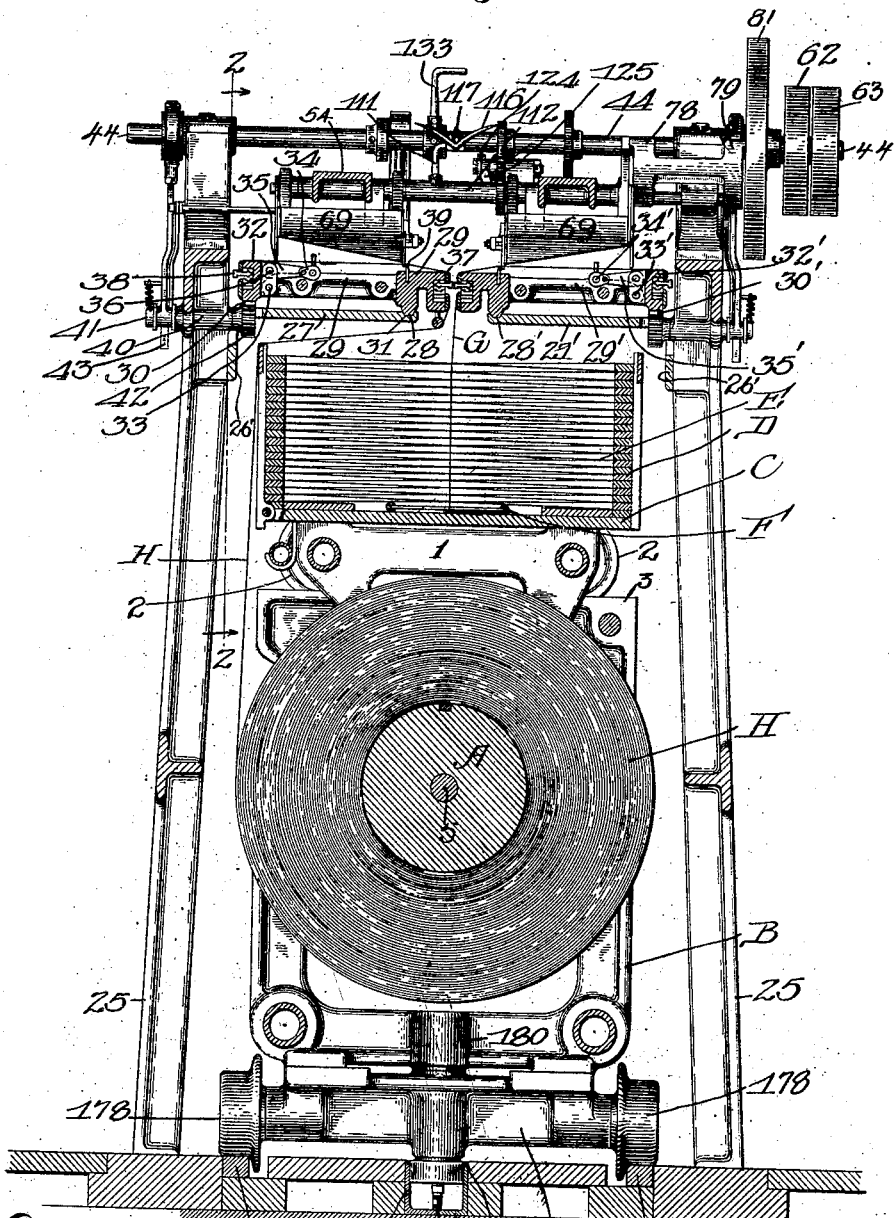

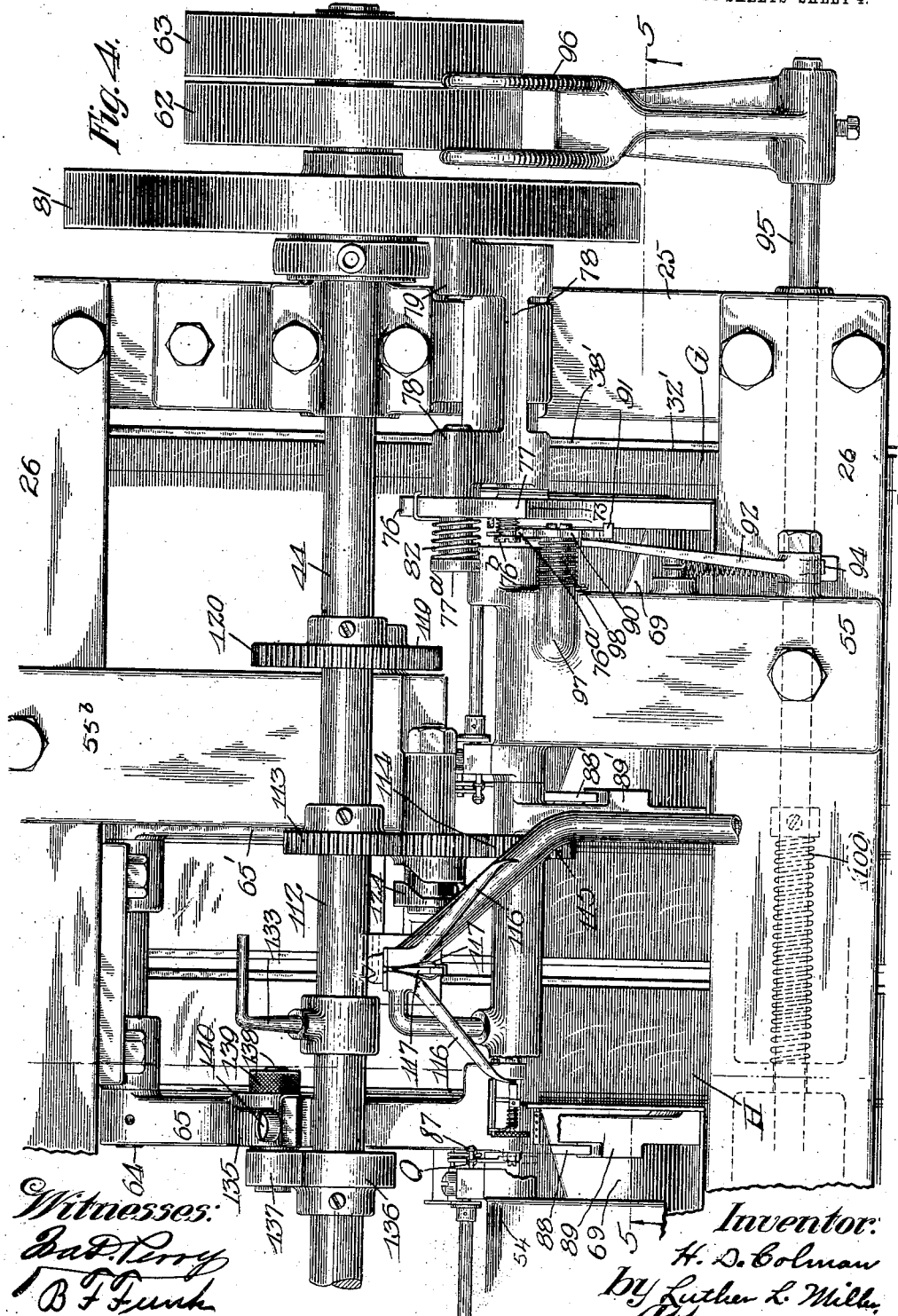

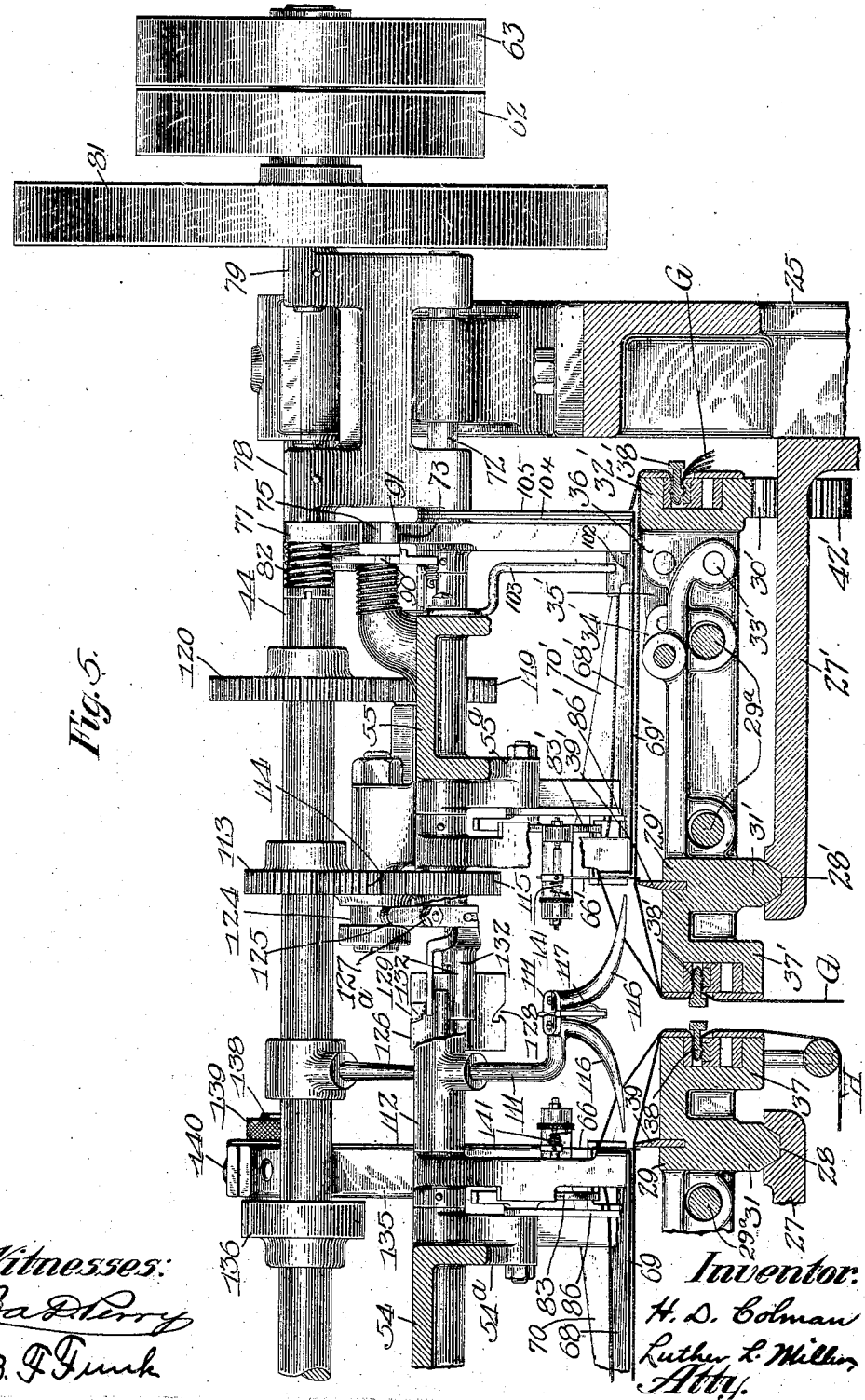

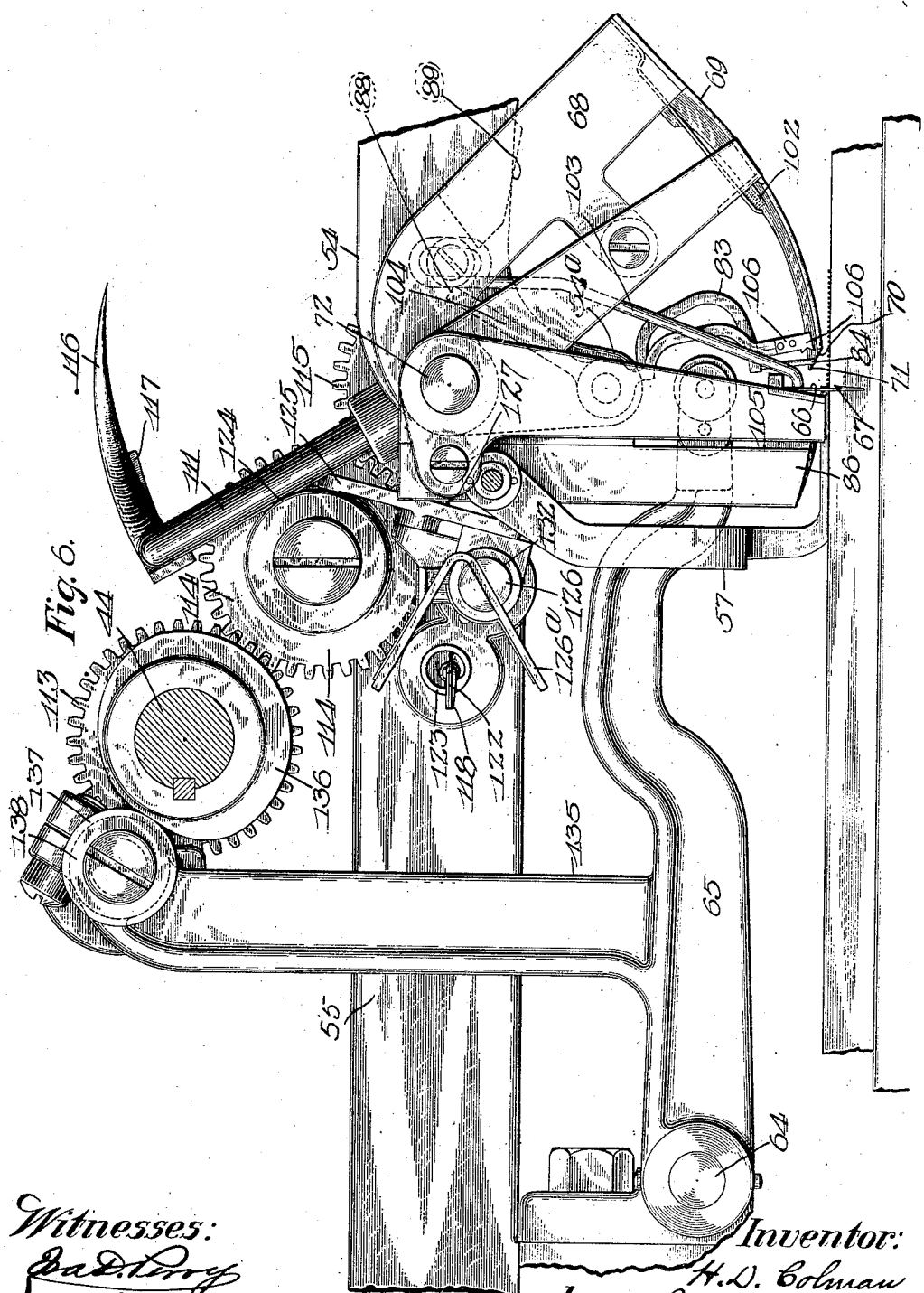

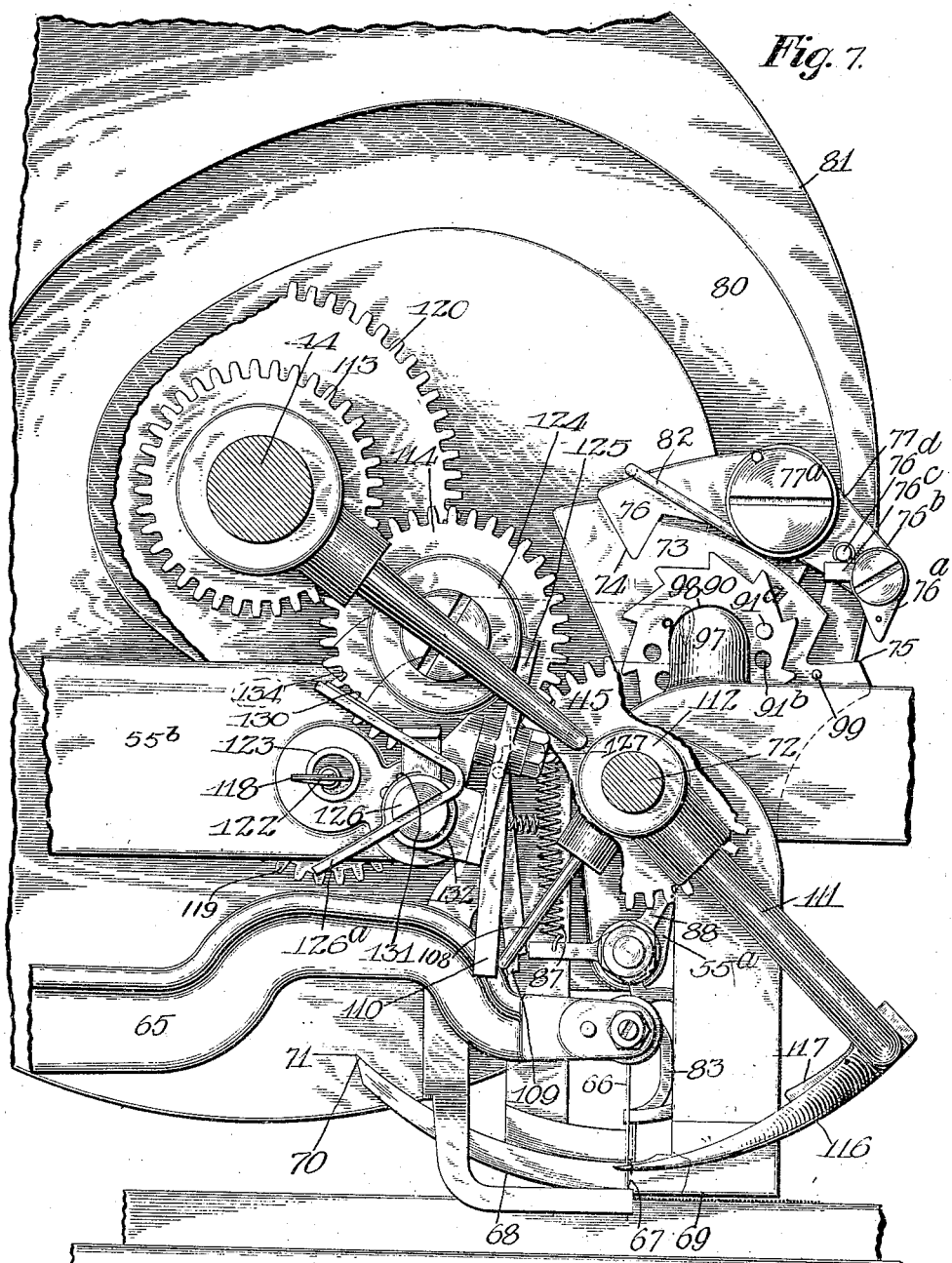

H. D. COLMAN.
WARP UNITING MACHINE.
APPLICATION FILED APR. 20, 1908.
1,069,081.
Patented July 29, 1913.
14 SHEETS—SHEET 8.
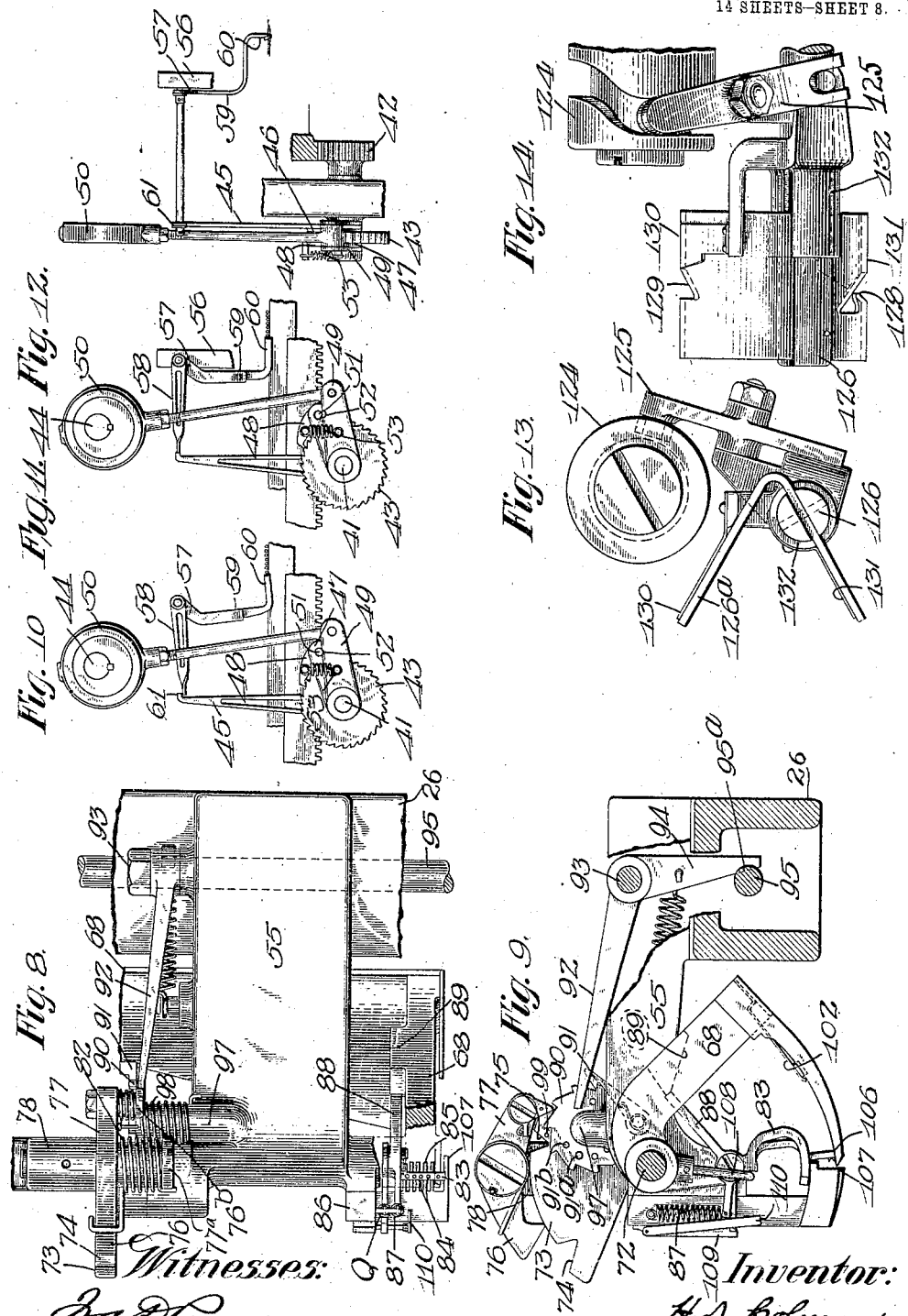

H. D. COLMAN.
WARP UNITING MACHINE.
APPLICATION FILED APR. 20, 1908.

1,069,081.

Patented July 29, 1913.
14 SHEETS—SHEET 9.

Witnesses:

Inventor:
Howard D. Colman
by Luther L. Miller
Attorney.

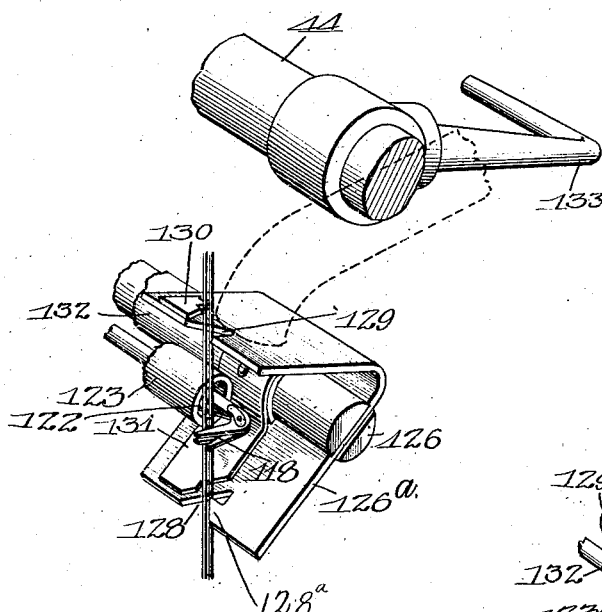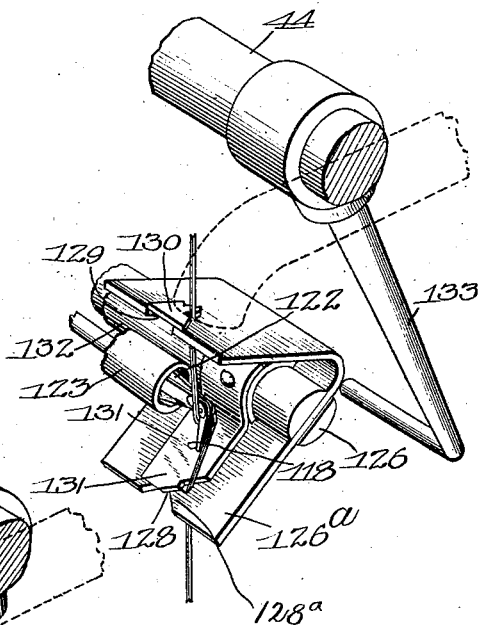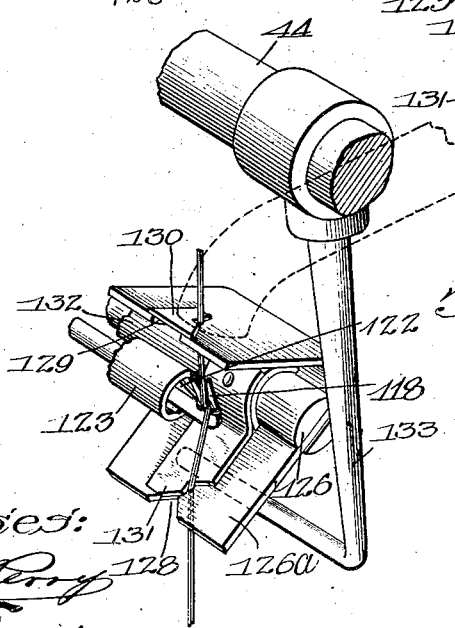

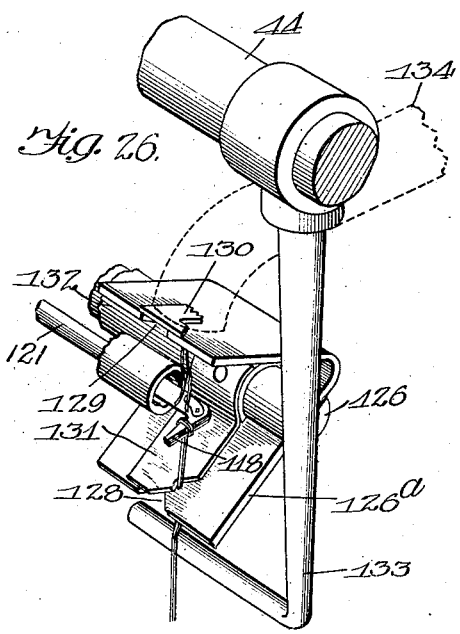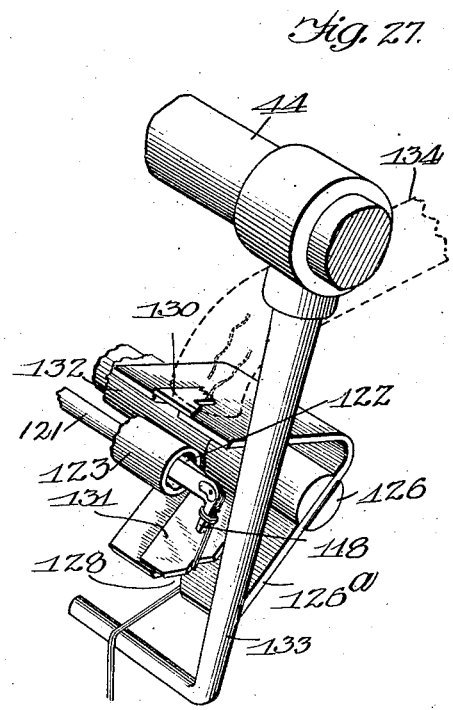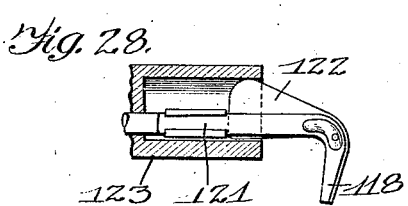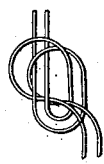

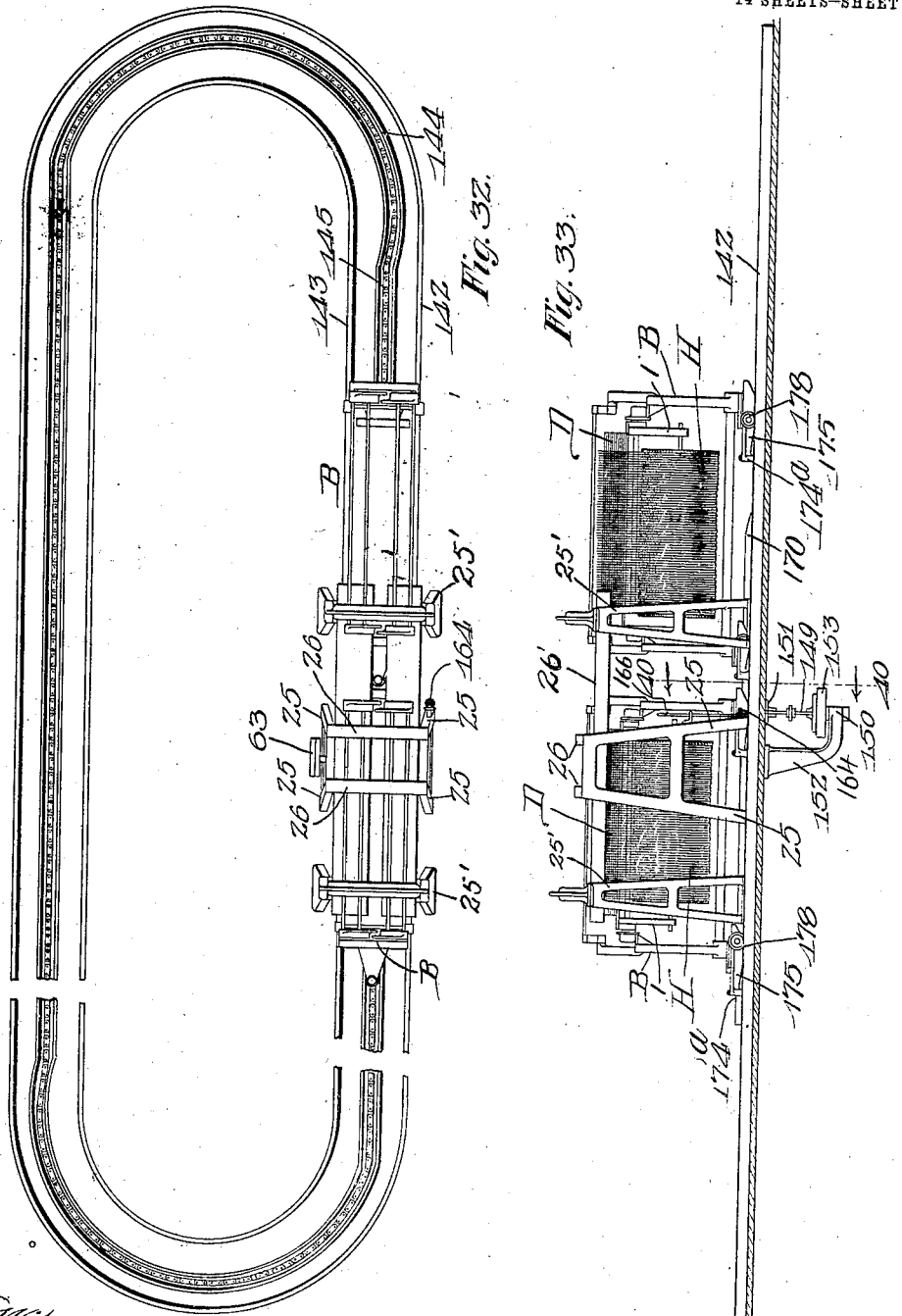

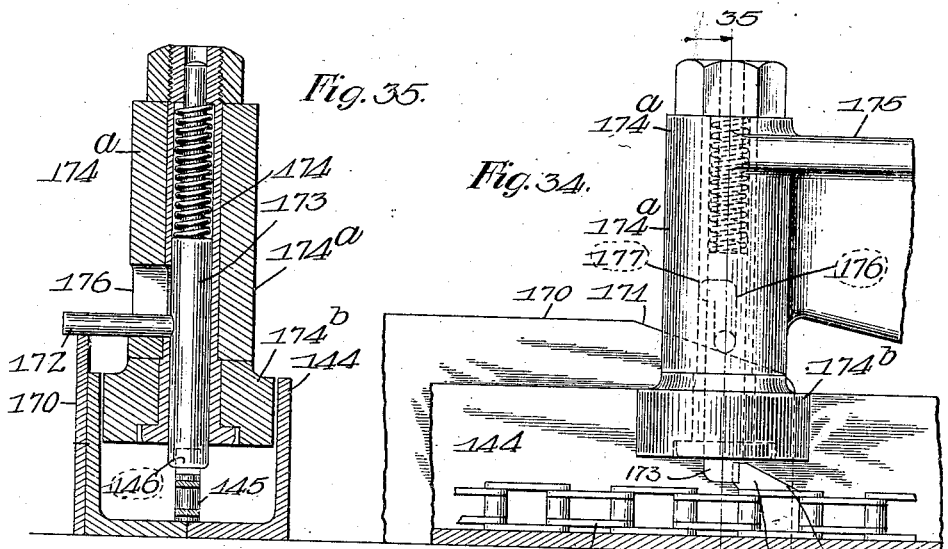
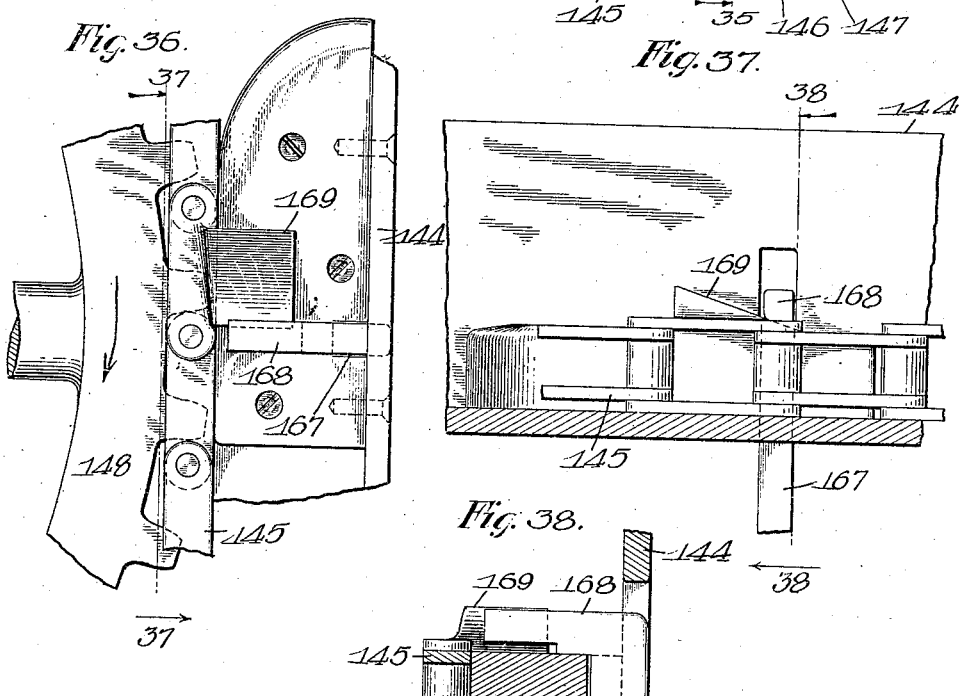

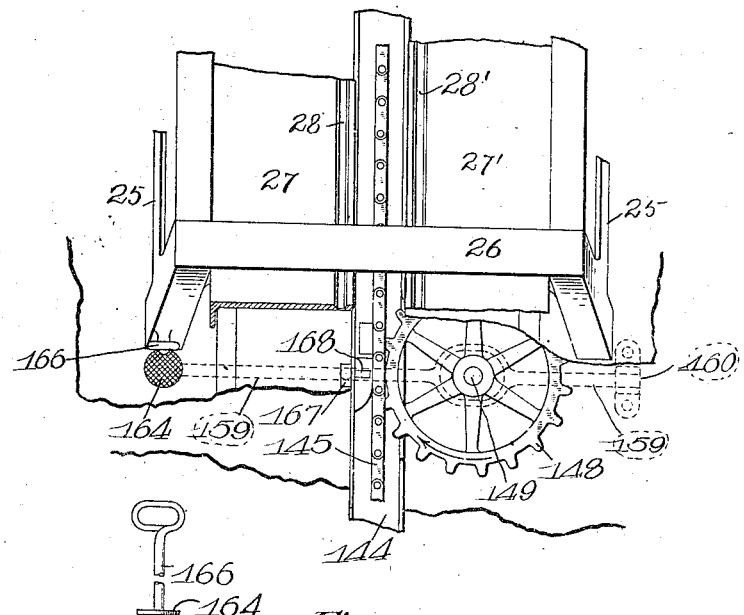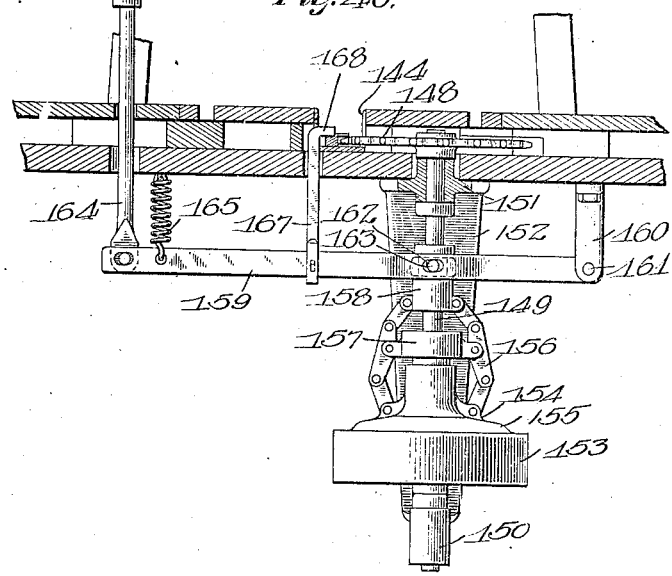

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, CO-PARTNERS DOING BUSINESS AT ROCKFORD, ILLINOIS, AS BARBER-COLMAN COMPANY.

WARP-UNITING MACHINE.

1,069,081.   Specification of Letters Patent.   Patented July 29, 1913.

Application filed April 20, 1908. Serial No. 427,978.

*To all whom it may concern:*

Be it known that I, HOWARD D. COLMAN, a citizen of the United States, residing at Rockford, in the county of Winnebago and State of Illinois, have invented certain new and useful Improvements in Warp-Uniting Machines, of which the following is a specification.

This invention relates to a means for uniting the individual threads of one warp to the individual threads of another warp.

Another object of the invention is to provide means for feeding the respective warps to a uniting mechanism.

Another object of the invention is to provide a simplified construction of mechanism for tying the ends of adjacent warps together.

Another object of the invention is to feed the warps to the tying mechanism by independent feeding means.

Another object of the invention is to provide means for continuously and automatically feeding the warp supports, the loom-beam and the harnesses past and from the uniting mechanism to a suitable place where the united warp threads, loom-beam and harnesses may be removed and others substituted, whereby a new set of warp supports will be in position to move up to the warp-uniting mechanism as soon as the previously introduced warps are united.

The object of the invention also is to improve generally on the art of connecting warp threads.

Figure 15:
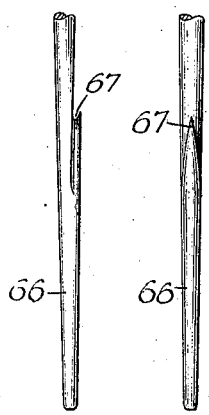
Figure 16:
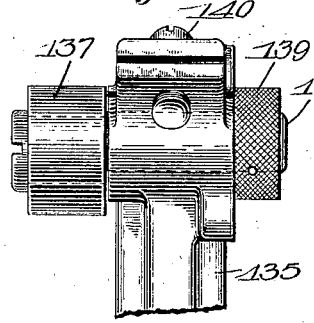
Figure 17:
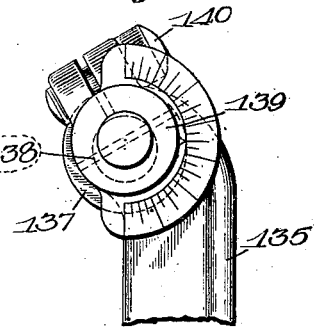
Figure 18:
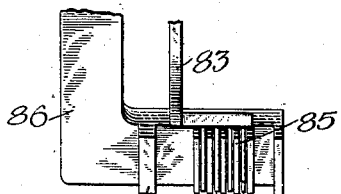
Figure 19:
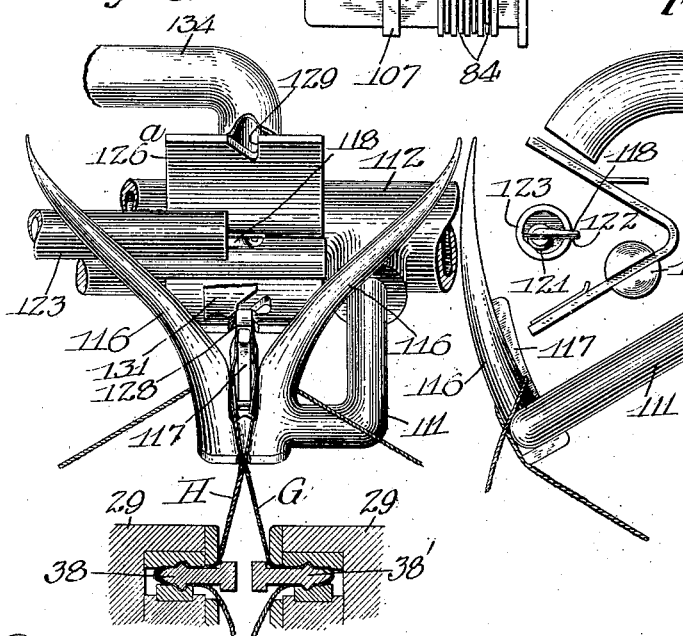
Figure 20:
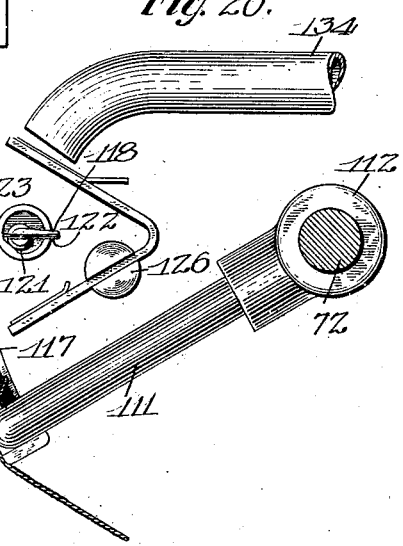

In the accompanying drawings, Figure 1 is a top plan view of a warp-uniting machine constructed in accordance with my invention. Fig. 2 is a sectional view on the line 2 2 of Fig. 3. Fig. 3 is a transverse sectional view on the line 3 3 of Fig. 1. Fig. 4 is an enlarged plan view of part of the tying-in mechanism, the knotter being removed. Fig. 5 is an enlarged transverse sectional view through the tying-in mechanism, parts being broken away. Fig. 6 is an enlarged side view of the tying-in mechanism. Fig. 7 is an enlarged side elevation showing portions of the tying-in mechanism. Fig. 8 is a plan view of part of the tying-in mechanism. Fig. 9 is a side view of the mechanism shown in Fig. 8. Fig. 10 is an elevation of the sensitively-controlled feed for one of the warps, the feed being shown in operative position. Fig. 11 is a similar view of the sensitively-controlled feed, the feed being shown as inoperative. Fig. 12 is an end view of the feed showing the pinion for engaging the rack on one of the warp carriages. Fig. 13 is an end view of a thread guide. Fig. 14 is a face view of said thread guide. Fig. 15 shows two views of one of the thread-selectors. Fig. 16 is an end view of the selector lever arm. Fig. 17 is a side view of the end of the selector lever arm. Fig. 18 is a detail view of a thread detector. Fig. 19 is an enlarged view of a conveyer for bringing the selected and separated threads together and a clamp for holding them preparatory to being acted upon by the uniting mechanism. Fig. 20 is an end view of the tying bill, the thread guide, and the thread conveyer, the pneumatic waste tube being shown in elevation. Fig. 21 (Sheet 1) is a plan view of a portion of one of the warp clamps showing how the actuating lever is connected to one of the slidable clamping bars. Fig. 22 is a side elevation of one of the warp clamps. Figs. 23 to 27, inclusive, are enlarged perspective views showing the different relative positions of the tying mechanism elements. Fig. 28 is a longitudinal sectional view through the tying-bill cam cylinder. Fig. 29 is a transverse sectional view through said cylinder. Fig. 30 is a sectional view through the tying-bill. Fig. 31 is a diagrammatic view of the knot tied by the machine. Fig. 32 is a plan view of the warp-tying machine and the conveyer for serving said machine, showing one set of warp supports in coöperative alinement with the warp-tying machine and another set ready to be moved into position to have its warp threads acted upon. Fig. 33 is a side elevation of the parts shown in Fig. 32. Fig. 34 is an enlarged detail view of the truck tongue and part of the conveyer. Fig. 35 is a sectional view on the line 35 35 of Fig. 34. Fig. 36 is a fragmentary plan view of the conveyer-actuating sprocket wheel and the friction-clutch release-bar. Fig. 37 is a sectional view on the line 37 37 of Fig. 36. Fig. 38 is a sectional view on the line 38 38 of Fig. 37. Fig. 39 is a plan view of the conveyer, the actuating sprocket wheel and the throw-off; and Fig. 40 is a sectional view on the line 40 40 of Fig. 33, the trucks being removed.

As generally understood by weavers, the threads of a warp must be drawn through the harnesses preparatory to weaving. To do this by hand is a laborious and expensive process. In carrying out my invention, I may tie the threads of a new warp to those of an old warp, and, by pulling the old threads with the attached new threads through the harness eyes and the reed, I am enabled to dispense with the hand operation. I may mount the new loom beam A (Fig. 3) on a truck B. A receptacle C on the truck is capable of receiving a plurality of harnesses D provided with the usual heddles E and the reed F. The truck is mounted upon an endless track to be hereinafter described so that it may be recurrently moved into operative relation with the warp-tying machine. For convenience in preparing the warps for the uniting operation, the means for supporting the warps and the loom elements on the truck is removable from the truck. As herein shown, said supporting means consists of a carriage 1 (Figs. 2 and 3) having rollers 2 which stand on rails 3 on the truck B. The carriage 1 has hooks 4 thereon to receive the shaft 5 of the loom beam A. The receptacle C for the harnesses and the reed is mounted upon the carriage 1.

The mechanism for accomplishing the uniting of the warps G and H is shown in the accompanying drawings as supported upon a frame consisting of standards 25 25 connected by the transverse bars 26 26, and two arches 25' connected together and to the standards 25 by bars 26'. Projecting inwardly from the respective standards are warp-carriage supporting brackets 27 and 27' and these brackets are provided with guide grooves 28 and 28'. During the tying-in operation, the bracket 27 supports the warp frame or carriage for the new warp, while the bracket 27' supports the warp carriage for the old warp. The warp carriage for the new warp is shown as comprising an approximately rectangular frame 29 having at one side a rack bar 30. At the opposite side of said frame is a rail 31 movable in the groove 28 of the bracket 27.

The warp carriages 29 29' are loosely mounted upon rods 29ᵃ (Figs. 1 and 5) fixed in the frame of the truck B. On one of the rods that supports the new-warp carriage 29 are fixed two collars 29ᵇ 29ᶜ. When the warp carriage 29 is advanced by the sensitively-controlled feed to be presently described, the frame of said carriage presses against the collar 29ᵇ and thus moves the truck B.

Pivoted to the frame of the warp carriage 29 is a movable warp clamp 32 supported by the pivot 33 and adapted to be swung through the medium of the crank 34 mounted on the frame and having a link connection 35 with the arm 36 of said movable clamp. The clamp 37 at the opposite side of the carriage is rigid with respect thereto. Both clamps are provided with insertion bars 38 by means of which the sheet of new-warp threads may be inserted into the clamps. When the clamps are closed, as hereinafter described, the threads will be securely held in clamped engagement with the warp carriage 29. By swinging the clamp 32 away from the clamp 37, and permitting the crank 34 to pass over dead center, the threads of the warp H will be stretched or tensioned, and the clamp 32 will be locked in stretching position.

By reference to Figs. 21 and 22 it will be seen that the insertion bars 38 and the threads may be secured in the clamps by a clamp bar 38ᵃ having inclined projections over which slide corresponding projections on a slidable bar 38ᵇ actuated by a pivoted lever 38ᶜ and a link 38ᵈ. Thus the threads may be quickly clamped between the insertion bar and the flange of the recess containing the clamping bar, or the threads may be quickly released by shifting the bar 38ᵇ in the proper direction (to the right, Fig. 22).

The threads are preferably passed over a longitudinally movable knurled ribbon 39, so that after the threads are stretched, a sidewise deflection may be imparted thereto by moving the member 39 longitudinally.

I have just described in detail the warp carriage for the new warp. The carriage for the old warp is oppositely disposed so that its movable clamp will be left-handed with respect to that of the new warp, but otherwise the same general construction prevails, so I have deemed it unnecessary to give a detailed description of the carriage for the old warp. I have, however, primed the reference numerals applied to the various parts in the old warp carriage which correspond to the numerals applied to the new warp carriage.

By reference to Fig. 3 it will be observed that the two warps lie in substantially the same horizontal plane and that the carriages are parallel with each other. This I find a convenient arrangement for facilitating a proper selection of adjacent threads from each of the warps preparatory to bringing them together for tying. The uniting mechanism is stationary. In the form of machine shown in this application, both warps move toward the tying mechanism and each warp is provided with a feed which, in all its essentials, is quite independent of the feed of the other warp. Both feeds are substantially of the same construction, so that a detailed description of one will suffice for both.

Journaled in a bearing 40 in the frame of the machine is an intermittently driven rotatory shaft 41 having on one end a pinion 42 which meshes with the rack 30 of the warp frame 29 (see Figs. 2 and 3.) On the shaft 41 (see Figs. 2, 3, 10, 11 and 12) is a ratchet wheel 43 which is adapted to receive motion from the main drive shaft 44 by appropriate mechanism. The mechanism shown herein consists of a bell crank lever loosely mounted on the shaft 41 and having an upstanding arm 45 and an approximately lateral arm 46. The lateral arm 46 of the bell crank lever is loosely connected to the shaft 41 and braced by a link 47. Interposed between the link and the arm 46 is a pawl 48 adapted to engage the peripheral teeth of the ratchet wheel 43. Loosely mounted on the shaft 41 is a lever 49 rocked on said shaft 41 by the drive shaft 44 through an eccentric 50. The link 47 is provided with a pin or stud 51 which is adapted to be engaged by the notch 52 of the lever 49, and a spring 53 connected to the pawl and to the lever 49 has a tendency to maintain said stud 51 in the notch 52. Projecting from one of the transverse members 26 are the brackets 54 and 55 (54 for the new warp and 55 for the old). See Fig. 1. On a bracket 56 (Fig. 12) carried by the bracket 54 is a pivoted feed lever 57 having a lateral projecting arm 58 and a depending arm 59 provided with a lateral extension 60. The extension 60 is what I term a sensitive feeler finger in that it is adapted to lie in the plane of the warp threads so that should a warp thread contact with the end thereof as shown in Fig. 11, the arm 58 will be raised to lie in the path of the projection 61 of the arm 45 and prevent the spring from pulling the arm 46 and the link 47 down to a position to have the arm 49 engage the pin 51 so as to actuate the pawl 48. When no thread is presented, however, on account of one having been previously selected to be tied, or on account of the spacing of the warp threads, the finger will swing on its pivot to approximately the position shown in Fig. 10, because its center of gravity is to one side of its pivot point. This swinging movement of the feeler finger will throw the arm 58 out of contact with the lever 45 and permit the pawl 48 to ride over a tooth in the ratchet wheel and permit the stud 51 to lie in the recess 52 whereby, upon the actuation of the lever 49, the ratchet wheel will be actuated the distance of one tooth.

It is to be understood that the parts are so constructed that when the arm 58 is in the path of the lever 45, the pawl cannot slide back over a ratchet tooth, because the arm 46 and the link 47 are rigid with the arm 45 and they carry the pawl. Therefore, while the drive shaft 44 may continually rotate and actuate the eccentric 50, so as to impart movement to the arm 49 on the shaft 41, no movement of the ratchet wheel can take place, unless the arm 58 is moved out of the path of the lever arm 45.

From the foregoing it will be apparent that the warp carriages 29 29' will be fed toward the operating mechanism step by step as it is necessary to present new threads to the selectors. Whenever threads are adjacent to the selectors or in position to be taken by them, the sensitively-controlled feed will be ineffective to move the warp carriages, feed movements occurring only as required.

The drive shaft 44 may be driven by a drive pulley 62 fast on said shaft, or the belt (not shown) may be shifted to the loose pulley 63 either automatically or by hand.

I have provided mechanism for selecting corresponding threads from both warps and uniting them. The mechanism for selecting the threads is shown as comprising a rock shaft 64 (Fig. 6) journaled in bearings in one of the bars 26. Carried by the rock shaft and rigid therewith are approximately parallel arms 65 and 65' (Fig. 4) one for each warp. Each arm carries a pivoted selector 66 comprising a shank having an upwardly-extending barb 67, which, upon the up-strokes of the respective levers, engages a thread and moves it slightly above the plane of the remaining warp threads and off the deflecting ribbon 39 or 39'. The thread will then spring to a straight line and away from the deflected sheet of threads so as to be in position to be picked up by the separators. At about the time the selectors raise the threads above their warps, the separators 68 and 68' move forward and carry the selected threads away from the adjacent ones;—setting them off as it were. The separators are shown as comprising arcuate blades 69 inclined transversely to provide inclined separating edges 70 with forwardly projecting separating wings 71. The separators are supported on the rock shaft 72 and rigid therewith, the shaft being mounted in the brackets 54 and 55. Rigid on the rock shaft 72 is a segment 73 (Figs. 4, 5, 8 and 9) provided with notches 74 and 75. The notch 74 is normally engaged by one tooth 76 of a double pawl 77 pivotally mounted on the stud 77ª. The pawl 77 is carried by a rocking bracket 78 loosely mounted on the shaft 72, said bracket having a projection 79 in engagement with the groove 80 of a rotary cam 81 on the drive shaft 44. Under ordinary conditions, the rotation of the cam will rock the bracket 78 so as to cause a rocking motion to be imparted to the pawl 77 communicating said motion to the segment 73 and thereby rocking the shaft 72 to move both separators toward and away from the warp.

The spring 82 on the rocking bracket 78, has a normal tendency to force the tooth 76 of the pawl 77 into the recess 74 of the segment 73. Under abnormal conditions, however, the force of the spring may be overcome, and the tooth 76 will ride out of its notch or recess 74.

Certain mechanism is provided whereby if the selectors fail to take a thread from either or both of the warps the separators will be held out of operation. A "try-again" mechanism may be brought into play which will prevent any operation of the separators until each selector has taken a thread. If after several tries two threads are not selected the machine stops. I will now describe how this is accomplished.

Pivoted to depending portions 54ª and 55ª of the brackets 54 and 55 are two stumbler forks 83 (Figs. 7 and 18) having alined fingers or tines 84 which alternate with similar tines or fingers 85 fixed to an arm 86 on either of the brackets 54 and 55. It will be observed that the selectors move in close proximity to the rigid fingers 85 so that if a thread is selected from one of the warps it will rest against the rigid fingers 85 and prevent the fingers 84 of the corresponding stumbler fork from passing therebetween. If, however, no thread is present, the fingers 84 will be permitted to swing between fingers 85 by the spring 87 so that the upwardly projecting extension 88 on said stumbler fork will be thrown into the path of the lug 89 rigid with the support for the corresponding separator 68 or 68′, thus both separators will be held against movement. In view of the fact that the separators are both on the same shaft 72 the engagement of one of them by one of the extensions 88 of the stumbler forks will be sufficient to hold the shaft against movement. The rocking bracket 78 however will swing so that the pawl 76 will be moved out of engagement with the notch 74 in the segment 73. This movement of the bracket 78 will cause the tooth 76ª (said tooth being spring held by spring 76ᵇ and provided with limited movement by the lug 76ᶜ which abuts against the projection 76ᵈ) to engage a tooth on the stumbler ratchet wheel 90 and move it one tooth, in which position it will be held by a pawl 91 (see Fig. 9). If upon the next movement of one of the selectors no thread is present, the bracket 78 will again swing idly in its bearings, and this will be continued for a determined number of times until after the determined number of tries have been made. If the ratchet wheel 90 is rotated far enough so that the pin 91ª comes in contact with a lever 92 the lever will be rocked on its pivot 93 and its forward end 94 will be moved out of engagement with a notch 95ª in the spring actuated longitudinally shiftable rod 95 so as to shift the belt fork 96 (Fig. 4) and thereby throw the belt from the drive pulley to the loose pulley, and the machine will be stopped. By reference to Fig. 7 it will be observed that there are a plurality of screw-threaded openings 91ᵇ for the reception of the screw pin 91ª. In view of the fact that for every time that the tooth 76 moves out of the recess 74 the ratchet wheel 90 is moved one tooth it will be apparent that the pin may be set in any opening 91ª to determine how many tries are to be made before the lever 92 is to be acted upon. The ratchet wheel 90 is rotatable on a stud 97 and a torsion spring 98 is provided which is wound when the ratchet wheel 90 is rotated by the tooth 76ª. Therefore, as the machine stumbles the spring 98 will be put under tension. If the ratchet is set to provide for a determined number of tries, say, for example, five, before throwing out the lever and both threads are selected after the third try, the pin 99 will come in contact with the pawl 91 and release the ratchet wheel 90 so that its spring 98 will return it to its normal position. The rod 95 is provided with a compression spring 100 for shifting it. The machine may be started by grasping the handle 101 (Fig. 1) on the rod 95 and exerting a pull so as to shift said rod to cause the lever 92 to drop into the notch 95ª so as to hold the belt on the drive pulley.

When the forward movement of the separator blades is arrested by one of the stumbler forks, as shown in Fig. 9, the tooth 76 drops into the notch 75 at the end of the swinging movement of the bracket 78 to the right, and when the bracket 78 swings to the left the separator blades are swung up out of the path of the selectors 66. Such upward withdrawing movement of the separators is limited by their striking against the brackets 54 55. When the separators thus stop against the brackets 54 55 the tooth 76 becomes disengaged from the notch 75.

During the normal return movement of the separator blades and during the withdrawing movement of said blades following a "stumble" of one, or both selectors, the stumblers 83 are moved away from the fingers 85 by two arms 108 fixed with relation to the separators and having angular lower ends adapted to engage said stumblers. As will be understood, this movement of the stumblers away from the fingers 85 is for the purpose of permitting the selectors to raise threads into the space between said stumblers and fingers and into position for setting off by the separator blades.

As a separator blade moves forward to set off a thread which has previously been selected, a yielding clamp 102 (Fig. 6) preferably lined with some fibrous material will pass over the thread so that the thread will be interposed between the clamp 102 and the inner face of the arcuate separator 69. At the proper moment the thread will be clamped between the element 102 and the inner face of the separator 69 by having the upper face of the clamp 102 come in contact with the inclined or cam face of a depending clamp finger 103 carried by the bracket 54 in one instance and the bracket 55 in the other. This clamp takes hold preparatory to severing the thread. By reference to Figs. 5 and 6 it will be apparent that the thread will be severed at a point adjacent to the outer side of the warp carriage 29 or 29' by the movable shear 104 carried by the separator coöperating with the stationary shear 105 carried, for example, by the bracket 54 in Fig. 6, and the thread will be prevented from jumping after having been severed under tension on account of the clamp 102. As the thread had been previously clamped just prior to or about the time of severing it would still be under some tension after being cut, so should the clamp 102 be released there might be some tendency for the thread to jump toward the longitudinal center of the machine and become entangled with some of the operative parts. In order to obviate this difficulty I have provided a friction clamp 106 which is pivoted to the depending portion of the bracket arm 55, in Fig. 9, and this clamp arm has a normal tendency to move toward the selected thread by the spring Q and hold the thread under slight restraint against the rigid lip 107 (Fig. 18) on the bracket 86. The arm 108 rigid with the separator moves the clamp 106 away from the lip when the separator moves to its upper or initial position. As the separator moves forward the latch 109 holds the thread clamp 106 open until the arm 108 comes into contact with a finger 110 fixed to the latch 109. Thus the thread may have time enough to enter the clamp 106 and permit the clamp to be closed to hold the thread under slight friction before the thread is cut by the shears. It is to be remembered that the same action is taking place with respect to one warp as is being effected upon the other warp so while the mechanism shown in Fig. 9 is illustrated as being for the old warp or for the warp on the right hand side of the machine as viewed in Fig. 3. a corresponding mechanism is acting upon the new warp on the left hand side of the machine.

After the threads have been selected, set off, and severed they are carried up to a thread-uniting mechanism so that the corresponding threads from a new warp may be joined to like threads in the old. This mechanism for joining the threads is best illustrated in Figs. 1, 4, 5, 7, 19 and 20. By reference to Fig. 5 it will be observed that after corresponding threads from the two warps have been selected and separated said threads lie in planes above the planes of the warps proper. Mechanism is provided for bringing together the selected and separated threads and for presenting them to a uniting mechanism. The form herein shown consists of a conveyer 111 supported by the sleeve 112 loose on the shaft 72 and driven from a gear 113 on the shaft 44 which meshes with an intermediate pinion 114 on the bracket 55$^b$ and said intermediate pinion 114 driving a gear 115 on said sleeve 112. The conveyer 111 comprises diverging fingers 116 having an approximately V-shape jaw in the constricted portion of which are spring clamps 117 (Fig. 19) to receive the respective threads and hold them in place as they are carried up to the uniting mechanism.

The uniting mechanism in this embodiment of the invention is shown to comprise a continuously rotating tying bill 118 said tying bill being carried by the bracket 55$^b$ and provided with a pinion 119 (Figs. 4 and 7) in mesh with a gear 120 on the shaft 44. The tying bill is provided with a shear for severing the ends of the threads after the knot has been made. It may consist of a part 121 rigid with respect to the pinion 119 and another part 122 pivoted to said part 121 and rotatable within a cam barrel 123 so as to impart a shearing and clamping movement to said part 122. For a full description of the construction and operation of the form of tying bill herein shown, reference may be had to Patent No. 755,110 issued to me on March 22, 1904. Upon a stud 126 is a stationary plate 126$^a$. The plate 126$^a$ is substantially V-shape in cross-section (see Fig. 20). The ends of the plate 126$^a$ are provided with guide notches 128 and 129 in line with the tying bill so that when the conveyer 111 moves a pair of threads up into the notches 128 129 (Figs. 19 and 20) the threads will be on the inner side of the tying bill. A cam 124 (Figs. 4, 5 and 6) fast to the gear 114 will then actuate the lever 125 pivoted at 127 to impart a transverse movement to the sleeve 132 which carries the guides 130 and 131. Said guides when in operative position overlie the notches 128 129 and thus retain the pair of threads in said notches during the formation of the knot. The guide 131 also serves to move the threads behind the projection 128$^a$, as shown in Fig. 24. After the loops of the knot have been formed and the waste ends sheared by the tying bill, a stripper finger 133 fixed on the continuously rotating shaft 44 engages the threads just below the plate 126$^a$ and pulls the knot off the tying bill (Figs. 26 and 27). In pulling the ends of the threads out of the tying bill the loops of the knot are drawn tight. The projection 128$^a$ affords a shoulder over which the threads are pulled by the rotating finger 133. The waste ends are carried off through the pneumatic chute or tube 134.

The shaft 64 is actuated to rock the selector arms so as to select the threads through the medium of an arm 135 which is in contact with a cam 136 on the shaft 44. It may be desirable to have a nicety of adjustment of the contacting portion of the arm 135 with the cam 136 so as to provide for different conditions of warps presented in the warp frames; therefore I have shown an eccentrically mounted roller 137 on the arm 135 (see Figs. 6, 16 and 17). This roller 137 is mounted upon an eccentric pin 138 which is frictionally held in the upper terminal of the arm 135 and by turning the knurled nut 139 after having loosened the screw 140 the selector levers may be so adjusted that the proper coaction will take place between the selectors and the warp threads. By reference to Fig. 5 it will be noticed that the selectors are resiliently pivoted in the arms 65 65', the springs 141 tending to swing the selectors against the foremost threads of their warps.

The pivotal connection of a selector with the arm which supports it will enable the selected thread to spring toward the pins 85 of the stumbler mechanism when said thread is moved from the ribbon 39 or 39ᵃ as the case may be. This tendency of the threads in a warp carriage 29 29' to spring forward is induced by the lateral tension on the threads due to shifting one of the ribbons, for example, 39. Just as soon, however, as the thread is taken from the selector by the separator, the selector point will move back to thread selecting position.

By reference to Figs. 2, 32, 33 and 35 to 40, inclusive, it will be observed that the warp-supporting means, the loom beam and their appurtenances may be fed past the warp uniting mechanism and conveyed therefrom by a suitable conveyer. In order to facilitate the introduction of the warps to and their removal from the uniting mechanism, I provide an endless conveyer so that the trucks which are fed from the discharge end of the machine will automatically find their way back to the receiving end of the machine. Means is also provided for stopping the conveyer both automatically and manually. I have also provided means whereby a truck will be automatically stopped when it reaches a determined point.

The endless conveyer comprises a track (best illustrated in Fig. 32) which may consist of the two rails 142 and 143. The warp-uniting mechanism is supported by the frame 25 26 25' 26' straddling the track. Between the rails 142 143 is an endless grooved guide 144. Within the guide 144 is a linked conveyer comprising a plurality of links 145 suitably joined together and suitable links are provided with upwardly extending projections 146 (Fig. 34) adapted to engage complementary projections from the trucks B. The projections 146 have inclined upper edges 147.

The conveyer is driven by a sprocket 148 (Figs. 39 and 40) on the shaft 149 in bearings 150 and 151 in the bracket 152 supported from the floor or other suitable support. On the shaft 149 is a pulley 153 which may be caused to drive said shaft 149 through the medium of a friction clutch 154 having a pulley engaging member 155 slidable on a shaft 149 and actuated by the links 156 which are fulcrumed on the collar 157 and in link connection with a slidable collar 158 on said shaft 149. The collar 158 and consequently the clutch member 155 may be moved into and out of clutching position by an actuating lever 159 which is fulcrumed to a bracket 160 at 161. This lever 159 is provided with an elongated slot 162 through which projects a pin 163 on the collar 158. At the end of the lever 159 distant from the fulcrum 161 is a pedal 164 whereby the operator may depress the free end of the lever 159 against the action of the spring 165. Connected to the free end of the lever 159 is a hand rod 166 which may be used in lieu of the pedal 164 for actuating said lever 159. As shown in Fig. 33, the treadle 164 and the hand lever 166 are located at the receiving side of the warp-tying machine.

167 (Figs. 36 to 39) is a lever having an arm 168 in the path of the projection 169 on one of the links, so that, as said block or projection 169 passes under the arm 168 of the lever 167, the clutch lever 159 will be raised and the pulley 153 will be permitted to rotate freely without actuating the shaft 149.

170 (Figs. 34 and 35) is an upstanding flange or guideway having an inclined portion 171 up which may ride a lateral projecting pin 172 on the spring pressed bolt 173 carried by the barrel 174 supported by the head 174ᵃ on the end of the tongue 175 of each truck B. The bolt 173 constitutes the complementary member for the projection 146. The lateral projecting pin 172 on the bolt 173 is capable of a vertical movement longitudinally of the barrel 174 and in the slot 176, the upper end of which terminates in a lateral offset portion 177 so that the projection 172 may be swung thereinto and the bolt 173 will be held out of position for engagement with the projection 146. The anti-friction roller 174ᵇ contacts with the flanges of the groove 144 as the truck passes along. The truck B is provided with rollers or wheels 178 which pass over and upon the rails 142 and 143. The wheels are carried by axles 179 swiveled to the main body of the truck at 180.

The tongues 175, of which there may be two for each truck, as shown in Fig. 33, may be engaged by the projections 146 and carried around the endless track, and the trucks may be stopped at any desired point for the purpose of loading and unloading. Unless manually stopped, they will automatically release themselves from the link conveyer when the projections 172 engage the stop 170, or the conveyer will cease moving when the stop 169 raises the lever 167.

When a truck is brought to the receiving end of the warp-tying machine, and has been moved up so that the pinions 42 42′ engage the racks 30 30′, the sensitively-controlled operation of said pinions will advance the warp carriages 29 29′. The advancing movement of the warp carriage 29 causes movement of the truck B through the engagement of said carriage with the collar 29^b (Fig. 1). As soon as the truck has passed beyond the warp-uniting mechanism, the conveyer will pick it up and carry it along to its proper destination where the loom beam, the united warps, the harnesses and other appurtenances may be removed and others substituted.

While I have shown only two trucks, it is obvious that any number necessary to permit the uniting mechanism to act continuously may be employed.

After two warps have been fed through the machine the harnesses, the united warps, and the reed may be transferred to the loom, it being understood that in order to cause the threads of the new warp to pass through the harness eyes and the reed, it will only be necessary to draw the knots through said eyes and between the reed dents.

It will be apparent to those skilled in the art that various mechanical embodiments of the invention are possible, and I therefore do not wish to be limited to the arrangement and construction shown.

I claim as my invention:

1. In a textile machine, in combination, stationary operating means, two movable warp-supporting means arranged to hold the supported portions of the two warps in the same horizontal plane, and sensitively-controlled means for feeding said warp-supporting means.

2. In a textile machine, in combination, stationary operating means, two warp carriages located side by side in the same horizontal plane, means for supporting said carriages, and means for imparting independent feed movements to said warp carriages.

3. In a textile machine, in combination, two warp carriages having contiguous sides and located in the same horizontal plane, means for supporting said carriages, means for bringing a thread from one of said warp carriages close to a thread from the other carriage and near the contiguous portions of said two warp carriages, and means for uniting said threads.

4. In a textile machine, in combination, two thread selecting means movable across the same horizontal plane, and a warp frame for each selecting means, and independently movable across the plane of movement of said selecting means.

5. In a warp-tying mechanism, in combination, means for supporting two warps, means for separating threads from the warps, a tying mechanism, a swinging flaring device arranged to receive the separated threads, draw them together and move them to the tying mechanism and means for swinging said device.

6. In a warp-tying mechanism, in combination, means for supporting two warps, means for separating threads from the warps, a tying mechanism, a swinging flaring device arranged to receive the separated threads, draw them together and move them to the tying mechanism, means for swinging said device, and means at the narrow portion of said swinging device for clamping the threads.

7. In a warp-tying mechanism, in combination, means for supporting two warps to lie in the same plane, means for separating threads from the warps, a tying bill, thread guides at opposite sides of said bill, a swinging device arranged to engage the separated threads and lay them in said guides, and means for swinging said device.

8. In a warp-tying mechanism, in combination, means for supporting two warps to lie in the same plane, two pivotally mounted arms fixed with relation to each other and arranged to swing upon the same axis, means for simultaneously swinging said arms in the same direction, and thread-engaging devices carried by said arms.

9. A sensitively-controlled feed for textile machines, comprising a drive element, a ratchet wheel fixed with relation to said element, a bell-crank lever and an arm loose on the axis of said ratchet wheel, means for swinging said arm, a pawl on one arm of said bell-crank lever arranged to engage said ratchet wheel, the first mentioned arm being arranged to rock said bell-crank lever, and means arranged to be engaged by a thread and arranged to engage the other arm of said bell-crank lever for limiting the rocking movement of said lever.

10. An endless warp conveyer and means for actuating said conveyer, in combination with a warp-uniting mechanism in the path of movement of the conveyer.

11. The combination of an endless track for warp-supporting trucks, a truck conveyer adjacent to said track, means for actuating said conveyer, and a warp-uniting mechanism adjacent to said track.

12. A warp-supporting truck having a warp carriage movably supported thereon, and a part on said truck against which the warp carriage may press for transmitting movement of said carriage to said truck.

13. A warp-supporting truck having two warp carriages mounted thereon for movement independently of each other, and means for transmitting movement of one of said carriages to said truck.

14. A warp-supporting apparatus consisting of a structure, two warp carriages mounted for movement on said structure, beam-supporting means in said structure, and means in said structure for supporting a reed and heddles.

15. A warp-supporting apparatus consisting of a structure, two warp-carriages mounted for movement on said structure, beam-supporting means in said structure below said carriages, and a harness and reed receptacle in said structure between said carriages and said beam-supporting means.

16. A warp-supporting apparatus consisting of a structure, two warp carriages mounted on said structure, and a carriage movably supported in said structure for supporting a beam, heddles and a reed.

17. A warp-supporting apparatus consisting of a structure having transverse ways therein, a carriage movably mounted on said ways, means on said carriage for supporting a beam to extend longitudinally of said structure, a reed and heddle receptacle on said carriage, and two warp frames on said structure.

18. A warp-supporting truck having two warp carriages mounted thereon side by side, said carriages being adapted to support two warps in the same horizontal plane, beam-supporting means in said truck directly below said carriages, and means between said carriages and said beam-supporting means for supporting loom-elements.

19. The combination of an endless track, a plurality of warp-supporting trucks movable on said track, and a warp-uniting mechanism adjacent to said track and arranged to operate upon warps carried by said trucks.

20. The combination of a supporting structure; a carriage movably supported in said structure; loom-beam-supporting means on said carriage; and loom-harness supporting means on said carriage directly above said beam-supporting means.

21. In a warp-uniting machine, in combination, means for supporting two warps to lie in the same plane; devices for selecting threads from the warps; devices for severing the selected threads at points removed from the adjacent portions of the warps; uniting means located near the adjacent portions of the warps; devices for bringing the severed threads together at the uniting means; and means for causing relative movement between said warp-supporting means and said devices and uniting means.

22. In a warp-uniting machine, in combination, two independent warp carriages arranged side by side so as to support the warps in the same horizontal plane; devices for selecting threads from the warps; devices for severing the selected threads at points adjacent to the outer sides of the warp carriages; uniting means located near the inner or adjacent sides of the warp carriages; devices for bringing the severed threads together at the uniting means; and means for causing relative movement between said warp carriages on the one hand, and said devices and uniting means on the other.

23. The combination of an endless track; warp-supporting trucks mounted on said track; means for moving trucks along said track; a framework bridging said track; and a warp-uniting mechanism mounted upon said framework above said track.

24. The combination of a supporting framework; a warp-uniting mechanism mounted in the upper part of said framework; a truck movable through said framework; means on said truck for supporting a loom beam; and means on said truck above said beam-supporting means for supporting two warps in the plane of action of said warp-uniting mechanism.

25. The combination of an endless track, a plurality of trucks movable on said track, two warp-carriages mounted on each truck for limited movement with relation to said truck and independently of each other, means for transmitting movement of one of said carriages to the truck, and a warp-uniting mechanism adjacent to the track and arranged to operate upon warps carried by said carriages.

HOWARD D. COLMAN.

Witnesses:
 Wm. D. Hintze,
 A. L. Pellon.